JOHN ASHWORTH.

Improvement in Loom Heddles.

No. 122,795.

Patented Jan. 16, 1872.

Witnesses.
N. C. Lombard.
W. C. Hibbard

Inventor.
John Ashworth

UNITED STATES PATENT OFFICE.

JOHN ASHWORTH, OF ANDOVER, MASSACHUSETTS.

IMPROVEMENT IN LOOM-HEDDLES.

Specification forming part of Letters Patent No. 122,795, dated January 16, 1872.

*To all whom it may concern:*

Be it known that I, JOHN ASHWORTH, of North Andover, in the county of Essex and State of Massachusetts, have invented a new Mode of Making Heddles for Weaving, of which the following is a specification:

My invention relates to the manner of making the eyes or mails in heddles from the twine or other material from which the rest of the heddle is made, by which the eyes will be rendered more durable, and the knots, by which eyes are usually made in heddles which are made of twine, are dispensed with, and the heddles are especially adapted to be made by machinery. This consists in forming the eye by simply crossing the two parts of the twine or other material above and below the mail or eye and securing the two together at the intersection by a small clasp, of metal which is clinched onto them, and forms the top and bottom of the eye, and holds the two parts securely together; and it also consists in forming in the said clasp a groove to receive the warp-thread, which thereby sustains the wear of the warp-thread when at work and prevents it from wearing upon the twine.

Figure 3:
Figure 1:
Figure 2:
Figure 4:

In the drawing, Figures 1 and 2 are two views, part in section, of one heddle and its eye, drawn to an enlarged scale of four times the natural size. Fig. 3 is a side view of the clasp before it is clinched upon the twines; and Fig. 4 shows a cross-section of the wire of which the clasps are made. The drawing shows more clearly than any verbal description how the twines are crossed to form the eye and how the clasps are applied thereto to confine the twines together above and below it. The several heddle-twines may be attached to the heddle-shafts in any of the ways usually practiced. To make the eyes by hand I have the clasps prepared by bending a piece of wire of a suitable length, having a cross-section such as is shown in Fig. 4 around a former to the shape shown in Fig. 3. The twines are crossed over a former to determine the size of the eye, and the clasps, as in Fig 3, are slipped over the crossings and their open ends closed down tightly upon the twines by pliers or any other suitable instrument, which completes the fastening.

It is my intention to make this kind of heddles by automatic machinery, and I have already devised a machine for that purpose, which will be the subject of another application for a patent; but the heddles may be successfully made by hand in the manner that I have described.

I do not limit myself to making the clasps of wire of the form of section shown, as this may obviously be varied and still have the property of confining the twines at their intersections by being clinched or compressed upon them, and retaining them by the rigidity of the clasp; nor do I limit myself to the use of twine for making heddles, for this method of making the eyes may be employed when threads of other kinds or wires are used.

What I claim is—

1. Heddle-eyes formed by crossing twines held together at their intersections by metal clasps clinched upon them, substantially as described, as a new manufacture.

2. A clasp to form the top and bottom of the eye, having the portion within the eye concaved, as described.

Executed October 13, A. D. 1871.

JOHN ASHWORTH.

Witnesses:
N. C. LOMBARD,
WM. C. HIBBARD.